US010009815B2

United States Patent
Masini et al.

(10) Patent No.: US 10,009,815 B2
(45) Date of Patent: Jun. 26, 2018

(54) AUTONOMOUS LTE-WLAN INTERFACE SETUP AND INFORMATION EXCHANGE

(71) Applicant: Telefonaktiebolaget LM Ericsson (publ), Stockholm (SE)

(72) Inventors: Gino Luca Masini, Stockholm (SE); Angelo Centonza, Stockholm (SE); Icaro L. J. Da Silva, Bromma (SE); Filip Mestanov, Sollentuna (SE); Mattias Tan Bergström, Stockholm (SE); Oumer Teyeb, Solna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 86 days.

(21) Appl. No.: 15/027,006

(22) PCT Filed: Jan. 15, 2016

(86) PCT No.: PCT/SE2016/050024
§ 371 (c)(1),
(2) Date: Apr. 4, 2016

(87) PCT Pub. No.: WO2016/163928
PCT Pub. Date: Oct. 13, 2016

(65) Prior Publication Data
US 2016/0302122 A1    Oct. 13, 2016

Related U.S. Application Data

(60) Provisional application No. 62/145,853, filed on Apr. 10, 2015.

(51) Int. Cl.
*H04W 36/14* (2009.01)
*H04W 48/20* (2009.01)
*H04W 84/04* (2009.01)
*H04L 29/12* (2006.01)
(Continued)

(52) U.S. Cl.
CPC ......... *H04W 36/14* (2013.01); *H04L 61/1511* (2013.01); *H04L 61/6063* (2013.01);
(Continued)

(58) Field of Classification Search
CPC ... H04W 84/16; H04W 76/02; H04W 84/042; H04B 7/2606; H04M 11/022
See application file for complete search history.

(56) References Cited

U.S. PATENT DOCUMENTS

| 2014/0161103 A1 | 6/2014 | Sirotkin et al. |
| 2014/0204903 A1 | 7/2014 | Kim et al. |
| 2016/0249259 A1* | 8/2016 | Park ..................... H04W 36/00 |

FOREIGN PATENT DOCUMENTS

WO    2015115953 A1    8/2015

OTHER PUBLICATIONS

Unknown, Author, "Consideration on WLAN scanning and power consumption", New Postcom, 3GPP TSG RAN WG2 Meeting #82, R2-131715, Fukuoka, Japan, May 20-24, 2013, 1-4.
Unknown, Author, "Setting Up the Xw", Ericsson, 3GPP TSG-RAN WG3 #87bis, R3-150740, Tenerife—Santa Cruz, Spain, Apr. 20-24, 2015, 1-4.
(Continued)

*Primary Examiner* — Chandrahas B Patel
(74) *Attorney, Agent, or Firm* — Murphy, Bilak & Homiller, PLLC

(57) ABSTRACT

A node of a radio access network, RAN, receives, from a WLAN Termination, WT, an Extended Service Set Identifier, ESSID, and/or a Basic Service Set Identifier, BSSID, for one or more WLAN access points controlled by the WT. The node maintains a mapping between the ESSIDs and/or the BSSIDs and corresponding WLAN access points of the WT. Responsive to receiving a measurement report from a UE, the measurement report indicating an ESSID and/or a BSSID, the node associates the UE with a WLAN access point, based on the maintained mapping. An interface may be established between the node and the WT.

26 Claims, 18 Drawing Sheets

(51) Int. Cl.
  *H04W 24/10* (2009.01)
  *H04W 88/08* (2009.01)
  *H04W 92/20* (2009.01)
  *H04W 84/12* (2009.01)

(52) U.S. Cl.
  CPC .......... *H04W 24/10* (2013.01); *H04W 48/20* (2013.01); *H04W 84/045* (2013.01); *H04W 84/12* (2013.01); *H04W 88/08* (2013.01); *H04W 92/20* (2013.01)

(56) References Cited

OTHER PUBLICATIONS

Unknown, Author, "WLAN/3GPP Radio Interworking—More on Idle and Connected mode", Ericsson, ST-Ericsson, Orange, 3GPP TSG-RAN WG2 #82, R2-131886, Fukuoka, Japan, May 20-24, 2013, 1-10.
Unknown, Author, "WT Address Look-Up", Ericsson, 3GPP TSG-RAN WG3 #89, R3-151638, Beijing, China, Aug. 24-28, 2015, 1-4.
3GPP, "3rd Generation Partnership Project; Technical Specification Group Radio Access Network; Study on Multi-RAT joint coordination (Release 13)", 3GPP TR 37.870 V1.0.0, Feb. 1-22, 2015.
Unknown, Author, "New WI Proposal: LTE-WLAN Radio Level Integration and Interworking Enhancement", 3GPP TSG RAN Meeting #67, RP-150510, Intel Corporation, China Telecom, Qualcomm Incorporated, Shanghai, China, Mar. 9-12, 2015, 1-9.
Unknown, Author, "Way forward on Multi-RAT Joint Coordination", 3GPP TSG-RAN3 Meeting #84, R3-141512, CMCC, Seoul, Korea, May 19-23, 2014, 1-3.

\* cited by examiner

| IE/Group Name | Presence | Range | IE type and reference | Semantics description | Criticality | Assigned Criticality |
|---|---|---|---|---|---|---|
| Message Type | M | | | | YES | reject |
| XWAP Transaction ID | M | | | | -- | |
| Global eNB ID | M | | | | YES | reject |

FIG. 9

| IE/Group Name | Presence | Range | IE type and reference | Semantics description | Criticality | Assigned Criticality |
|---|---|---|---|---|---|---|
| Message Type | M | | | | YES | reject |
| XWAP Transaction ID | M | | | | – | – |
| WT ID | M | | | | YES | reject |
| Broadcasted ESSIDs | | | | Complete list of ESSIDs broadcasted by the APs served by the WT | YES | reject |
| >ESSID | M | 1..<maxESSIDsperWT> | | | | |
| Served Access Points | | 1..<maxAPsperWT> | | Complete list of WLAN APs served by the WT | YES | reject |
| >Served AP Information | M | | | | – | – |
| Criticality Diagnostics | O | | | | YES | ignore |

| Range bound | Explanation |
|---|---|
| maxESSIDperWT | Maximum no. of ESSIDs broadcasted by the APs served by the WT. |
| maxAPsperWT | Maximum no. of WLAN APs that can be served by a WT. |

*FIG. 10*

| IE/Group Name | Presence | Range | IE type and reference | Semantics description | Criticality | Assigned Criticality |
|---|---|---|---|---|---|---|
| Message Type | M | | | | YES | reject |
| XWAP Transaction ID | M | | | | – | – |
| WT ID | M | | | | YES | reject |
| Broadcasted ESSIDs | | 1..<maxESSIDsperWT> | | Complete list of ESSIDs broadcasted by the APs served by the WT | YES | reject |
| >ESSID | M | | | | | |
| >Served Access Points | | 1..<maxAPsperESSID> | | Complete list of WLAN APs served by the WT | YES | reject |
| >>Served AP Information | M | | | | – | – |
| Criticality Diagnostics | O | | | | YES | ignore |

| Range bound | Explanation |
|---|---|
| maxESSIDperWT | Maximum no. of ESSIDs broadcasted by the APs served by the WT. |
| maxAPsperESSID | Maximum no. of WLAN APs that can be under one ESSID. |

*FIG. 11*

| IE/Group Name | Presence | Range | IE type and reference | Semantics description | Criticality | Assigned Criticality |
|---|---|---|---|---|---|---|
| Message Type | M | | | | YES | reject |
| XWAP Transaction ID | M | | | | – | – |
| WT ID | M | | | | YES | reject |
| Broadcasted ESSIDs to add | | 0..<maxESSIDssperWT> | | List of new ESSIDs broadcasted by the APs served by the WT | YES | reject |
| >ESSID | M | | | | – | – |
| Broadcasted ESSIDs to delete | | 0..<maxESSIDssperWT> | | List of ESSIDs no more broadcasted by the APs served by the WT | YES | reject |
| >ESSID | M | | | | – | – |
| Served Access Points to add | | 0..<maxAPsperWT> | | List of new WLAN APs served by the WT | YES | reject |
| >Served AP Information | M | | | | – | – |
| Served Access Points to delete | | 0..<maxAPsperWT> | | List of WLAN APs no more served by the WT | YES | reject |
| >Served AP Information | M | | | | – | – |
| Criticality Diagnostics | O | | | | YES | ignore |

*FIG. 13*

| IE/Group Name | Presence | Range | IE type and reference | Semantics description | Criticality | Assigned Criticality |
|---|---|---|---|---|---|---|
| Message Type | M | | | | YES | reject |
| XWAP Transaction ID | M | | | | — | — |
| Criticality Diagnostics | O | | | | YES | reject |

FIG. 14

| IE/Group Name | Presence | Range | IE type and reference | Semantics description | Criticality | Assigned Criticality |
|---|---|---|---|---|---|---|
| Message Type | M | | | | YES | reject |
| XWAP Transaction ID | M | | | | -- | -- |
| ESSID List | | 0 .. <maxESSIDs> | | List of queried ESSIDs | YES | reject |
| >ESSID | M | | | | -- | -- |
| BSSID List | | 0 .. <maxBSSIDs> | | List of queried BSSIDs | YES | reject |
| >BSSID | M | | | | -- | -- |

| Range bound | Explanation |
|---|---|
| maxESSIDs | Maximum no. of queried ESSIDs. |
| maxBSSIDs | Maximum no. of queried BSSIDs. |

*FIG. 16*

AUTONOMOUS LTE-WLAN INTERFACE SETUP AND INFORMATION EXCHANGE

TECHNICAL FIELD

The present invention generally relates to wireless communication networks, and particularly relates to interfaces between cellular and WLAN networks.

BACKGROUND

The wireless local area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications"). The IEEE 802.11 specifications regulate the functions and operations of the Wi-Fi access points (APs) or wireless terminals, collectively known as "stations" or "STA," in the IEEE 802.11 standards, including the physical layer protocols, Medium Access Control (MAC) layer protocols, and other aspects needed to secure compatibility and inter-operability between access points and portable terminals. Wi-Fi is commonly used as a wireless extension to fixed broadband access, e.g., in domestic environments and in so-called hotspots, like airports, train stations and restaurants. Most current Wi-Fi/WLAN deployments are totally separate from mobile radio networks, and can be seen as "non-integrated," from the perspective of the user terminal.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies (RATs). Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users of the operators' regular cellular networks.

In particular, 3GPP has studied ways to more tightly integrate LTE and WLAN, in particular for operator-deployed WLAN, so that traffic from WLAN-enabled user equipments (UEs—3GPP terminology for an access terminal) can be offloaded to WLAN from an eNodeB and vice versa. In early iterations of the standards for this integration, this tightened integration was achieved through semi-static policy setting, via Access Network Discovery and Selection Function (ANDSF) and/or offload thresholds broadcasted by the eNodeB (3GPP terminology for an evolved base station—also referred to as an "eNB").

A 3GPP Rel-13 study item entitled Multi-RAT Joint Coordination has been recently started in 3GPP TSG RAN3 [3GPP TR 37.870]. The scope and requirements for the Multi-RAT Joint Coordination SI have been further defined in 3GPP working group meetings. In particular, for the 3GPP-WLAN coordination part, it has been agreed to focus on non-integrated 3GPP/WLAN nodes (i.e., as so-called standalone eNodeB and standalone AP), since integrated nodes are a matter of implementation.

Among the requirements of the study item [3GPP TR 37.870] is the investigation of potential enhancements of RAN interfaces and procedures to support the joint operation among different RATs, including WLAN. It has also been agreed that i) coordination involving WLAN and 3GPP is the priority of the study item, and ii) the statements on 3GPP/WLAN must be complementary to RAN2 work [R3-141512]. This complement could be achieved by the specification of an interface between the E-UTRAN and WLAN, which may occur in future releases of the standards.

The main functionality so far envisioned for this interface, called so far the "Xw interface," is the support for traffic steering from LTE to WLAN via the reporting of different sets of information from WLAN to the eNodeB so that educated steering decisions can be taken. Also, 3GPP has recently approved a RAN2 work item on full network controlled 3GPP/WLAN traffic steering and aggregation [RP-150510, available at ftp://ftp.3gpp.org/tsg_ran/TS-G_RAN/TSGR_67/Docs/RP-150510.zip], and thus new functionalities of the Xw interface can be envisioned.

As defined so far, the Xw interface is terminated in the eNodeB on the LTE network side, and in a logical node called WT (WLAN Termination) on the WLAN side. The WT can physically reside in an AP or in an AC and is assumed to have IP connectivity to the relevant WLAN nodes. Possible realization of the protocol and architectural of the Xw interface are depicted in FIGS. 1 and 2. Note that in the figures, the AP/AC has been assigned the role of the WT for the sake of clarity, but the WT node can be another node in the WLAN.

It is recognized herein that there are inefficiencies involved with Xw interface setup. Accordingly, improved techniques are needed for setting up the Xw interface or other interface between a radio access network node and a WT.

SUMMARY

Embodiments of the present invention comprise apparatuses and methods for correlating radio information reported by a user equipment (UE) with the appropriate network addresses required to set up an interface, e.g., an Xw interface, between a radio access network (RAN) node, such as an eNodeB, and a wireless local-area network termination (WT).

It is recognized herein that an eNodeB, or eNB, may benefit from autonomously compiling and maintaining a mapping table that includes at least the following information about its neighbor wireless local-area network (WLAN) nodes: Transport Network Layer (TNL) address(es), a WT ID (a unique WT network node identifier), broadcasted Extended Service Set Identifiers (ESSIDs), and broadcasted Basic Service Set Identifiers (BSSIDs). The Extended Service Set, of which the WLAN AP is a part, comprises one or multiple interconnected Basis Service Sets (WLAN APs), which appear as one logical entity to any UE/WLAN terminal connected to any of the underlying Basis Service Sets. An AP Location includes GPS coordinates or other location information related to the position of the WLAN AP. The TNL address(es) of the WT can be preconfigured in the eNB and/or looked up, e.g., using DNS queries. All other parameters can be exchanged and updated in the eNB via appropriate XwAP procedures. In particular, the eNB can query the WT about a newly found BSSID (as reported by a served WLAN-enabled UE). In the event that multiple APs pertaining to a WT are configured to broadcast the same BSSID, the WT indicates this to the eNB with an appropriate information element (IE) in the relevant XwAP message(s) and the eNB takes this information into account.

According to some embodiments of the presently disclosed techniques, a method in a radio access network node of a wireless communication network includes receiving, from a WT, an ESSID and/or a BSSID for one or more WLAN access points controlled by the WT. The method also includes maintaining a mapping between the ESSIDs and/or the BSSIDs and corresponding WLAN access points of the WT. The method further includes, responsive to receiving a measurement report from a UE, the measurement report indicating an ESSID and/or a BSSID, associating the UE with a WLAN access point, based on said mapping. An interface, e.g., an Xw interface, may be established between the radio access network node and the WT that controls the associated WLAN access point.

According to some embodiments, a method at a WT controlling one or more WLAN access points includes sending, to a radio access network node, an ESSID and/or a BSSID for one or more WLAN access points controlled by the WT. The method may also include responsive to receiving a request from the radio access network node, establishing an interface, such as an Xw interface, to the radio access network node.

According to some embodiments, a radio access network node, configured to maintain a mapping for establishing an interface between the radio access network node and a WT, is configured to receive, from the WT, an ESSID and/or a BSSID for one or more WLAN access points controlled by the WT. The radio access network node is further configured to maintain a mapping between the ESSIDs and/or the BSSIDs and corresponding WLAN access points of the WT, and to associate the UE with a WLAN access point, based on said mapping, responsive to receiving a measurement report from UE, where the measurement report indicates an ESSID and/or a BSSID.

According to some embodiments, a WT, controlling one or more WLAN access points and configured to send information for establishing an interface between a radio access network node and the WT, is configured to send, to the radio access network node, an ESSID, and/or a BSSID, for one or more WLAN access points controlled by the WT. The WT is also configured to, responsive to receiving a request from the radio access network node, establish the interface to the radio access network node. This interface may be an Xw interface, for example.

Other embodiments include apparatus, computer program product, computer readable medium and functional implementation embodiments that perform the operations of the method claims. Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 9 illustrates a setup request message sent from an eNodeB to a WT, according to some embodiments.

FIG. 10 illustrates a setup response message sent from the WT to the eNodeB, according to some embodiments.

FIG. 11 illustrates a message sent from the WT to the eNodeB, according to some embodiments.

FIG. 13 illustrates a configuration update message sent from the WT to the eNodeB, according to some embodiments.

FIG. 14 illustrates a configuration update acknowledge message sent from the eNodeB to the WT, according to some embodiments.

FIG. 16 illustrates a configuration query message sent from an eNodeB to a WT, according to some embodiments.

DETAILED DESCRIPTION

An interface between a WT and a radio access network node, such as an LTE eNB, can be set up following radio measurement reports by one or more WLAN-enabled UEs to the serving eNB. For example, after the UE reports the relevant parameters for the WLAN(s) it detects (e.g. ESSID, BSSID, channel, signal strength, etc.), the eNB can try to set up the interface with the appropriate WT(s). This interface may be referred to as an "Xw interface," for example, but may have or come to have a different name, in some embodiments of the systems described herein.

Prior to the present disclosure, there is no way for the eNB to correlate the radio information reported by the UE with the appropriate network address(es) required to set up the Xw interface. An eNB can already be preconfigured with the ESSID(s) or BSSID(s) present in its neighborhood, to be broadcasted in a System Information Block (SIB) as assistance data for UEs, but this does not contain network-level information useful for setting up network interfaces. Such information could in principle be statically configured via Operations, Administration and Maintenance (OAM), but for high numbers of WLAN APs that can potentially overlap with the eNB coverage, and given the fact that new WLAN APs can be easily deployed in areas with high capacity demand, this seems infeasible.

An additional problem is the fact that multiple WLAN APs may be configured to broadcast the same BSSID (i.e., the AP MAC address) towards UEs/STAs, in order to make inter-AP mobility easier for some UE implementations. Some additional logic will be required in the eNB to resolve this ambiguity, e.g., toward OAM and react appropriately. Moreover, unlike when compiling the Neighbor Relation Table (NRT) and setting up the X2 interface to a neighbor eNB via ANR (Automatic Neighbor Relations), the eNB cannot rely on the Mobility Management Entity (MME) to look up the network address of the neighbor AP, since that would require the MME to be either pre-configured with information about each and every WLAN AP, which would simply shift the burden of pre-configuration to the MME, or to be aware of WLAN deployment, which is not always the case and would increase its processing load.

Figure 1:
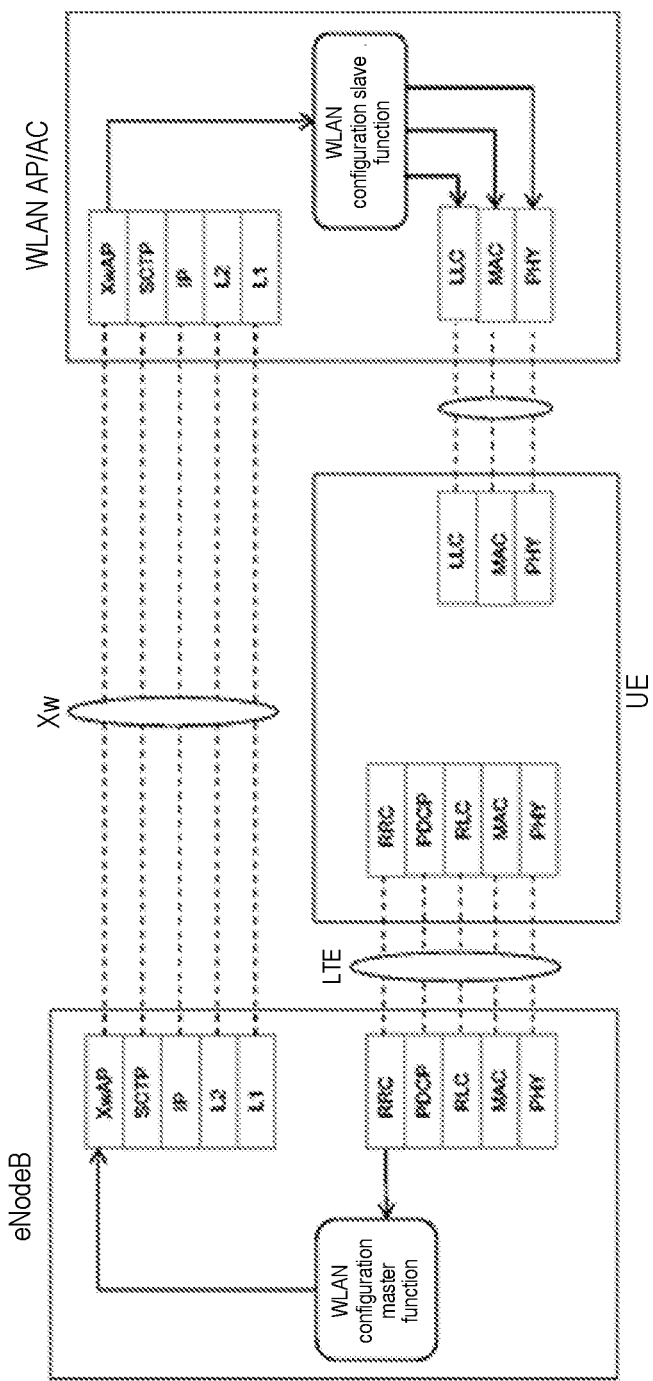
FIG. 1 is a diagram of a protocol stack of an eNodeB, a UE and a WLAN AP/AC.
Figure 2:
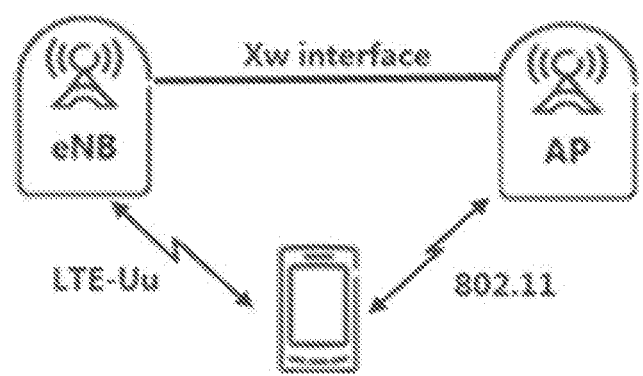
FIG. 2 is a diagram illustrating an architecture involving an Xw interface.
Figure 3:
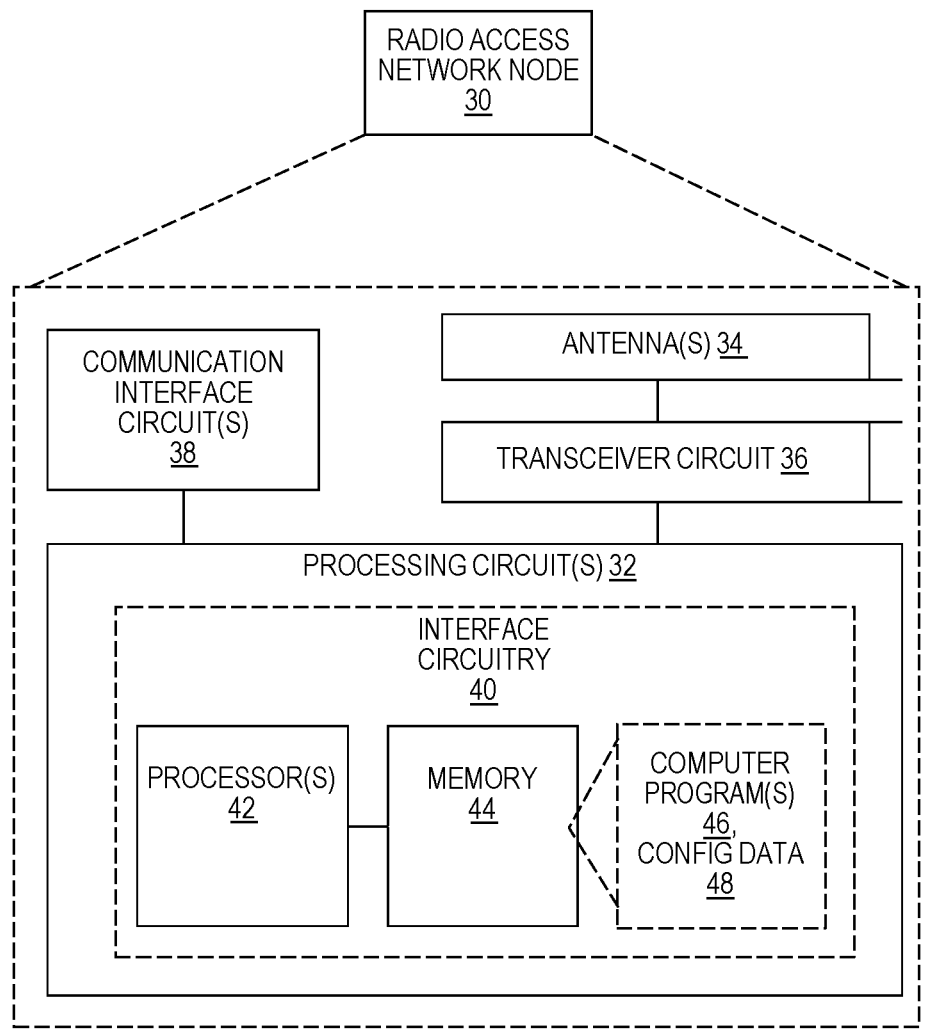
FIG. 3 illustrates a block diagram of a radio access network node configured to maintain a mapping for establishing an interface between the radio access network node and a WT, according to some embodiments.

The embodiments described herein provide apparatuses and methods for correlating radio information reported by the UE with the appropriate network addresses required to set up the Xw interface. FIG. 3 illustrates a diagram of a radio access network (RAN) node 30, such as a base station or an eNodeB, according to some embodiments. The RAN node 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The RAN node 30 may also include a communication interface circuit 38 for communicating with nodes in the core network such as a network node, other peer radio nodes, and/or other types of nodes in the network. The RAN node 30 can communicate with one or more network nodes in a WLAN, such as one or more WLAN access points and/or WLAN access controllers.

The RAN node 30 also includes one or more processing circuits 32 that are operatively associated with the communication interface circuit 38 and transceiver circuit 36. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the RAN node 30.

The processor 42 may execute a computer program 46 stored in the memory 44 that configures the processor 42 to receive, from a WT, an ESSID and/or a BSSID for one or more WLAN access points controlled by the WT. The processor 42 is also configured to maintain a mapping between the ESSIDs and/or the BSSIDs and corresponding WLAN access points of the WT. For example, the ESSIDs may be mapped to corresponding WLAN access points. In an alternative example, the BSSIDs may be mapped to corresponding WLAN access points. In another example, both the ESSIDs and the BSSIDs may be mapped to corresponding WLAN access points. The processor 42 is configured to, responsive to receiving a measurement report from a UE (the measurement report indicating an ESSID and/or a BSSID), associate the UE with a WLAN access point, based on the mapping. This structure and functionality may be referred to as interface circuitry 40 in the processing circuit 32.

Figure 4:
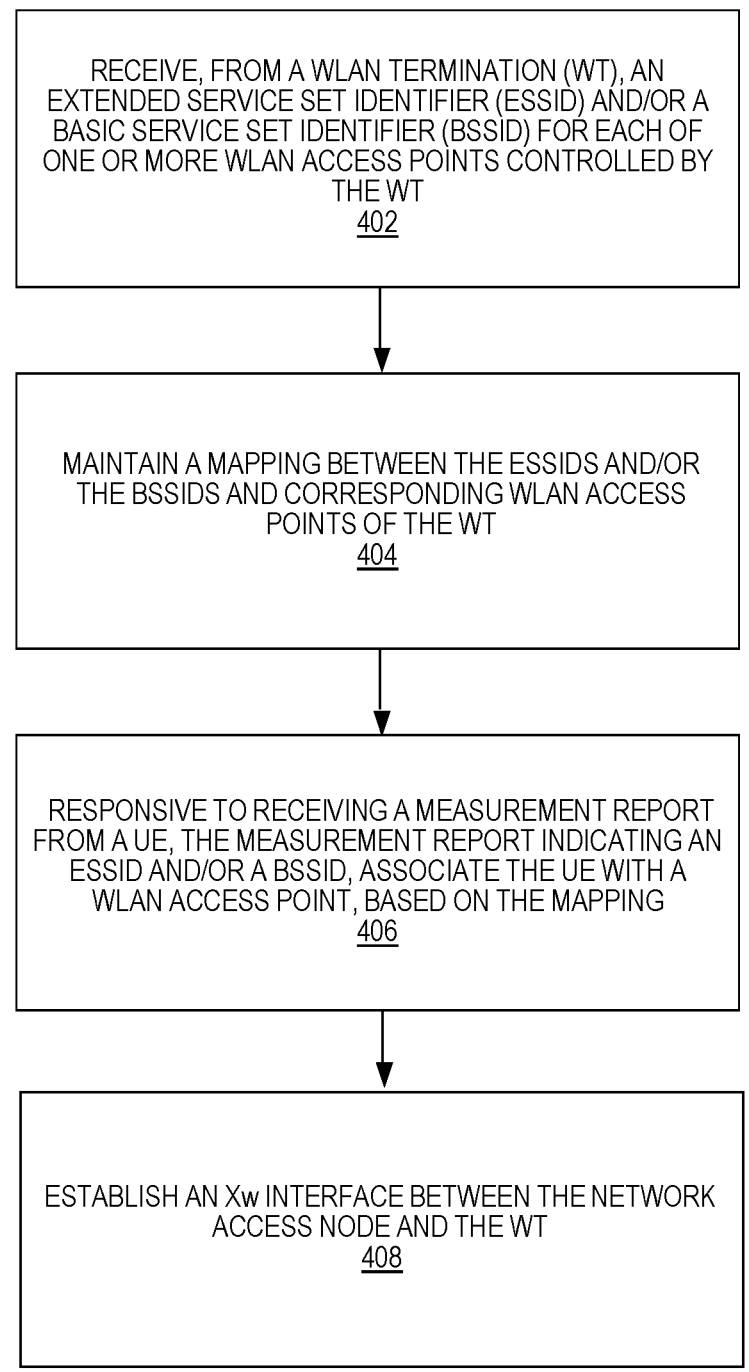
FIG. 4 illustrates a method in a radio access network node for maintaining a mapping for establishing an interface between the radio access network node and a WT, according to some embodiments.

The interface circuitry 40 is configured to perform a method, such as method 400 of FIG. 4, according to some embodiments. The method 400 includes receiving, from a WT, an ESSID and/or a BSSID for one or more WLAN access points controlled by the WT (block 402). The method 400 includes maintaining a mapping between the ESSIDs and/or the BSSIDs and corresponding WLAN access points of the WT (block 404). The method 400 also includes, responsive to receiving a measurement report from a UE (the measurement report indicating an ESSID and/or a BSSID), associating the UE with a WLAN access point, based on the mapping (block 406). The method may include establishing an Xw interface or similar interface (block 408).

In some cases, the method 400 includes identifying a TNL address corresponding to the WT and associating the TNL address to the WT in the mapping. The TNL addresses for relevant WTs may be preconfigured in the RAN node. The method 400 may also include performing a Domain Name System, DNS, query to obtain TNL addresses for relevant WTs. ESSIDs and/or BSSIDs may also be requested from the WT.

Figure 5:
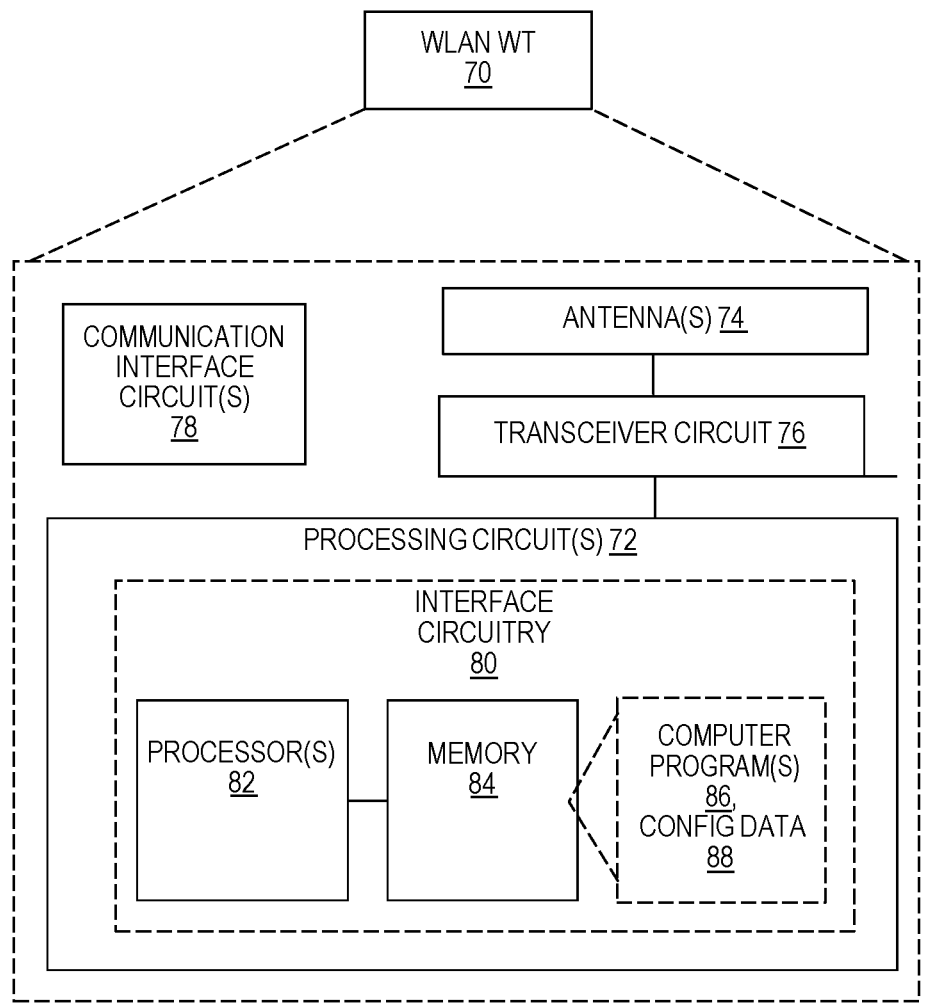
FIG. 5 illustrates a block diagram of a WT configured to send information to a radio access network node for establishing an interface between the radio access network node and a WT, according to some embodiments.

FIG. 5 illustrates a diagram of a WT 70, according to some embodiments. The WT controls any number of access points (APs) and may function as or reside in an AP-AC, or another node. In some embodiments, such an AP or AC may include components and functionality as illustrated in FIG. 5.

The WT 70 can provide an air interface to wireless devices, e.g., Wi-Fi or IEEE 802.11 standards, which is implemented via antennas 74 and a transceiver circuit 76. The transceiver circuit 76 may include transmitter circuits, receiver circuits, and associated control circuits that are collectively configured to transmit and receive signals according to WLAN technologies. The WT 70 may also include a communication interface circuit 78 for communicating with nodes in the core network and/or other types of nodes in the network.

The WT 70 also includes one or more processing circuits 72 that are operatively associated with the communication interface circuit 78 and transceiver circuit 76. The processing circuit 72 comprises one or more digital processors 82, e.g., one or more microprocessors, microcontrollers, DSPs, FPGAs, CPLDs, ASICs, or any mix thereof. More generally, the processing circuit 72 may comprise fixed circuitry, or programmable circuitry that is specially configured via the execution of program instructions implementing the functionality taught herein, or may comprise some mix of fixed and programmed circuitry. The processor 72 may be multi-core.

The processing circuit 72 also includes a memory 84. The memory 84, in some embodiments, stores one or more computer programs 86 and, optionally, configuration data 88. The memory 84 provides non-transitory storage for the computer program 86 and it may comprise one or more types of computer-readable media, such as disk storage, solid-state memory storage, or any mix thereof. By way of non-limiting example, the memory 84 comprises any one or more of SRAM, DRAM, EEPROM, and FLASH memory, which may be in the processing circuit 72 and/or separate from the processing circuit 72. In general, the memory 84 comprises one or more types of computer-readable storage media providing non-transitory storage of the computer program 86 and any configuration data 88 used by the AP 70.

The processor 82 may execute a computer program 86 stored in the memory 84 that configures the processor 82 to send, to a radio access network node, an ESSID and/or a BSSID for one or more WLAN access points controlled by the WT. The processor 82 is also configured to, responsive to receiving a request from the radio access network node, establish an interface, e.g., an Xw interface, to the radio access network node. This structure and functionality may be referred to as interface circuitry 80 in the processing circuit 72.

Figure 6:
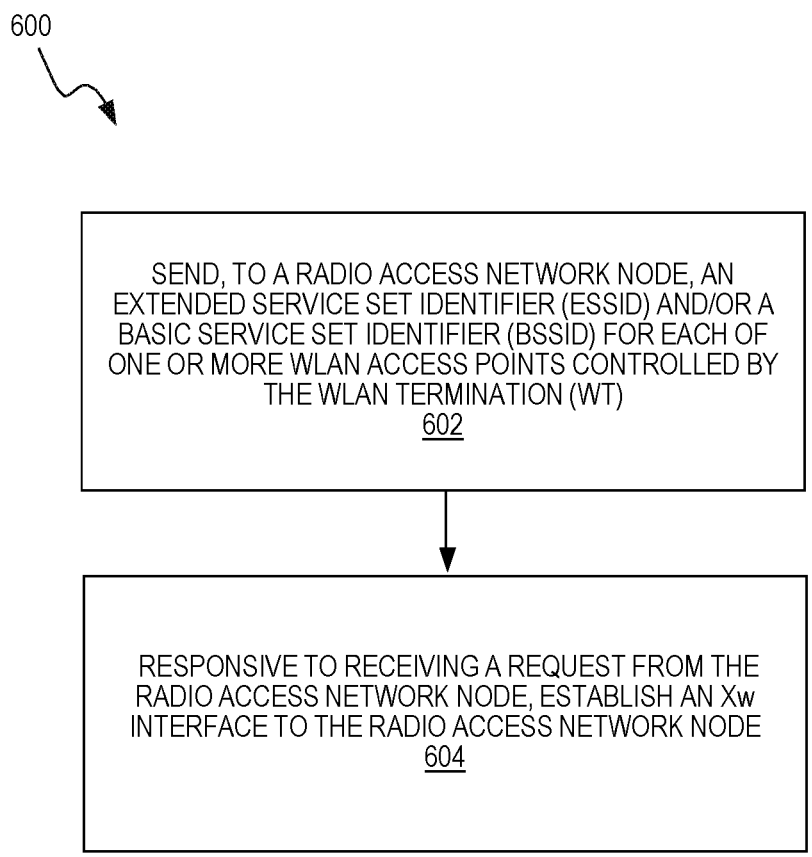
FIG. 6 illustrates a method in a WT for sending information to a radio access network node for establishing an interface between the radio access network node and a WT, according to some embodiments.

The interface circuitry 80 is configured to perform a method, such as method 600 of FIG. 6, according to some embodiments. The method 600 includes sending, to a radio access network node, an ESSID and/or a BSSID for one or more WLAN access points controlled by the WT (block 602). The method 600 also includes, responsive to receiving a request from the radio access network node, establishing an interface, such as an Xw interface, to the radio access network node (block 604).

Figure 7:
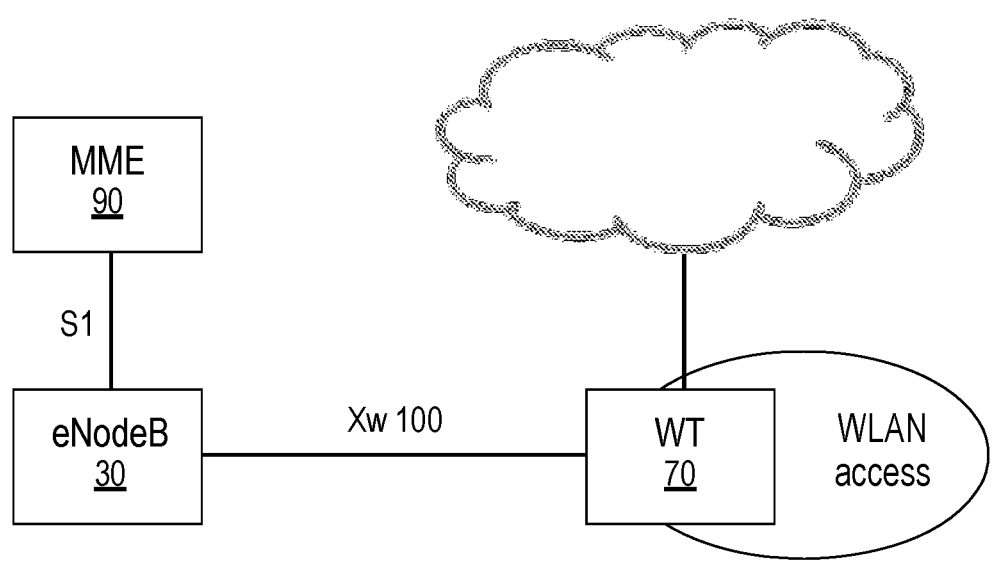
FIG. 7 is a diagram illustrating an Xw interface between an eNodeB and a WT.

FIG. 7 shows a basic diagram of an Xw interface 100 between a RAN node 30, such as eNodeB 30, and a WT 70. Although eNodeB 30 is used to represent a RAN node 30, embodiments of the RAN node 30 are not limited to eNodeBs and may include other cellular RAN nodes. According to various embodiments, the WT 70 and the eNodeB node 30 may request, respond to and coordinate with each other to assist the eNodeB 30 in identifying the WT 70 and APs associated with UE measurements. WT 70 and eNodeB 30 may establish an interface, such as an Xw interface 100, between the WT 70 and the eNodeB 30. The eNodeB 30 need not rely on an MME 90 to look up the network address of a neighbor AP.

In previous Xw interface setup procedures, the assumption was that there is a direct interface between an eNodeB and a WLAN AP. Various embodiments described herein involve the case of the Xw interface setup/(re)configuration when there is a WT that is controlling/interfacing several APs towards the eNodeB.

Figure 8:
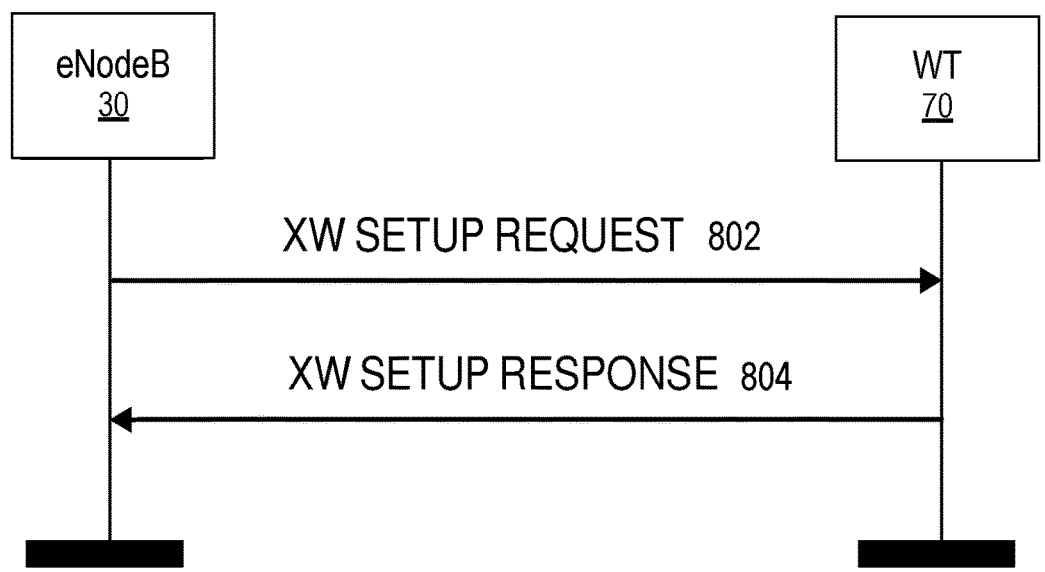
FIG. 8 is a diagram illustrating an Xw setup procedure, according to some embodiments.

In some embodiments, the WT 70 signals to the RAN node 30 its WT ID, ESSID(s) and/or BSSID(s) of the WLAN APs under the control of the WT 70 during Xw interface setup. This can be achieved using the procedure shown in FIG. 8, initiated by the eNodeB 30. For example, the method 400 may include sending a setup request message to the WT 70. This is shown by Xw SETUP REQUEST message 802 in FIG. 8. The Xw SETUP REQUEST message 802 includes an interface access point transaction identifier that uniquely identifies the setup transaction and a unique global network access node identifier that identifies the RAN node 30 with a RAN. These identifiers may be, for example, a XwAP Transaction ID and a Global eNB ID, respectively. The XWAP Transaction ID is a parameter that uniquely identifies the setup transaction. This can be used to distinguish such a transaction from other similar procedures involving other eNodeBs. The Global eNB ID is a parameter that uniquely identifies an eNodeB within the LTE RAN.

A sample tabular structure for the Xw SETUP REQUEST messages 802 is shown in FIG. 9. The BSSID broadcasted by each AP is included in the Served AP Information IE, together with radio-related information (frequency band, channel, protocol version) useful for setting up the relation. The XwAP Transaction ID and Criticality Diagnostics IEs are shown in the table of FIG. 9. The Global eNB ID is also shown in the table of FIG. 9. The TNL address(es) of the WT can be preconfigured in the eNodeB 30 via OAM, or looked up by the eNodeB 30 via DNS queries according to a configuration.

Upon reception of the Xw SETUP REQUEST message 802, the WT 70 shall deduce that an Xw interface has to be setup and that it should respond with the Xw SETUP RESPONSE message 804, which acknowledges acceptance of Xw establishment. Method 600 may include sending a setup response message, such as the Xw SETUP RESPONSE message 804, to the RAN node 30 responsive to receiving the request.

Optionally, the Xw SETUP REQUEST message 802 may contain a list of cells served by the sending eNodeB 30 and a list of neighboring cells for the sending eNodeB 30. This information may be taken into account by the WT 70 in order to create neighbor relations between each served AP and the cells served by the eNodeB 30 or the cells neighboring the eNodeB 30.

As shown in FIG. 10, the Xw SETUP RESPONSE message 804 contains the same XWAP Transaction ID specified in the Xw SETUP REQUEST message 802. The Xw SETUP RESPONSE message 804 contains a WT ID, which is a parameter uniquely identifying the WT within the Wi-Fi access network. The Xw SETUP RESPONSE message 804 may contain a list of ESSIDs which may be used by APs associated to or served by the WT 70. This information may be used by the eNodeB 30 when receiving UE measurements reporting one or more ESSIDs. The eNodeB 30 may then be able to identify the correct WT 70 for such reported APs.

The Xw SETUP RESPONSE message 804 may also contain a list of Served Access Point information, which may include for example a list of BSSIDs used by the APs associated to or served by the WT 70. As described above, this information may be useful when UEs report AP measurements. The measurements may include BSSIDs, which the eNodeB 30 would be able to associate to APs connected to the WT 70 with which the Xw interface has been setup. These lists are shown in the table of FIG. 10.

FIG. 10 also shows a second table with parameters maxESSIDperWT and the maxAPsperWT. The parameter maxESSIDperWT indicates the maximum number of ESSIDs broadcasted by the APs served by the WT 70, while max APsperWT indicates the maximum number of WLAN APs that can be served by a WT 70.

It should be noted that in the above and subsequent messages, it has been shown that the ESSIDs and the BSSIDs can be communicated independently (e.g., the Broadcasted ESSIDs and Served Access points are not related in the message). For example, given an ESSID1 and an ESSID2, and given that there are four APs, BSSID1 to BSSID4, the first two belonging to ESSID1 and the rest belonging to ESSID2, it might be beneficial to have this information as well. So, an alternative to the above message can be used to include this aspect, as shown in FIG. 11. For example, the range of the Served Access Points is limited by the maxAPsperESSID parameter in FIG. 11 rather than the maxAPsperWT parameter shown in the tables of FIG. 10. The maxAPsperESSID parameter indicates the maximum number of WLAN APs that can be under one ESSID, as shown by the second table of FIG. 11.

The eNodeB 30 uses the information received in the Xw SETUP RESPONSE message 804 to populate and maintain its internal WNRT (WT Neighborhood Relationship Table). The WNRT is a table that includes at least the following information for each WT: WT ID, TNL address(es), Broadcasted ESSID(s), Broadcasted BSSID(s). The WNRT may include other parameters such as an "Xw no removal" flag, indicating whether an Xw interface may or may not be removed.

Figure 12:
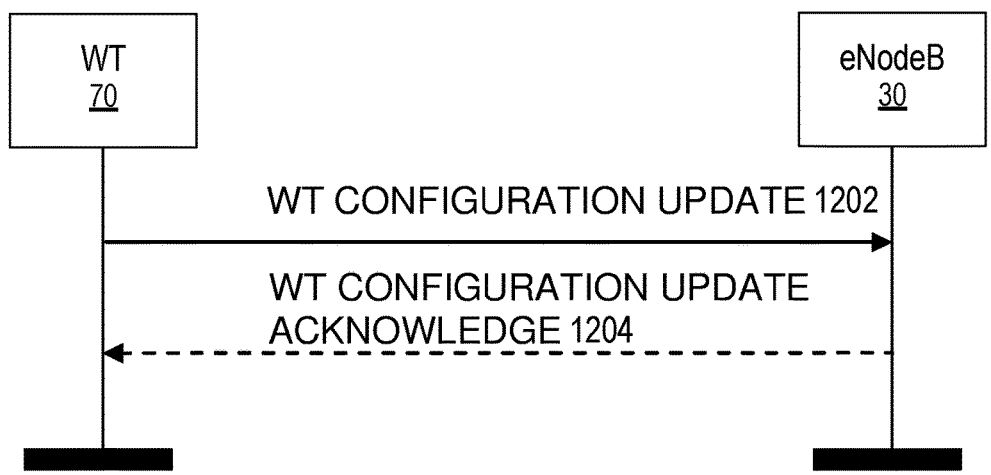
FIG. 12 is a diagram illustrating a configuration update procedure, according to some embodiments.

In some embodiments, the WT 70 signals to the eNodeB 30 any changes in its configuration using the WT Configuration Update procedure, shown in FIG. 12. For example, method 400 may include sending a configuration update message to the WT 70, where the configuration update message comprises a list of cells served by the RAN node 30 and a list of neighboring cells for the RAN 30. An example configuration update message is shown by the WT CONFIGURATION UPDATE message 1202 in FIG. 12. Sample tabular structures for the messages are shown in FIG. 13. Similar to the case of WT SETUP RESPONSE message 804, ESSID to BSSID grouping info can also be included. The example table in FIG. 13 includes a list of new ESSIDs to be broadcasted by the APs that are served by the WT 70 (to be added). The table also includes a list of ESSIDs to no longer be broadcasted by the APs served by the WT 70 (to be deleted). Likewise, the table includes a list of new Service Access Points served by the WT 70 (to be added) and a list of Service Access Points to no longer be served by the WT 70 (to be deleted). Served AP information and Criticality Diagnostics is also included in the table.

Although the basic use of the WT CONFIGURATION UPDATE message 1202 is to update the eNodeB 30 about changing conditions in the WT 70 configuration or to respond to an eNodeB 30 query, the WT configuration update message 1202 can also be used to address limitations of the value of the maxESSIDperWT and the maxAPsperWT. If these are not sufficient to include all the APs that need to be communicated during the Xw SETUP RESPONSE message 804, the WT 70 can send multiple WT CONFIGURATION UPDATE messages 1202 towards the eNodeB 30 to communicate all the required information.

The WT CONFIGURATION UPDATE ACKNOWLEDGE message 1204 is sent by an eNodeB 30 to a WT 70 to acknowledge update of information for a TNL association. FIG. 14 illustrates an example WT CONFIGURATION UPDATE ACKNOWLEDGE message 1204. The table of FIG. 14 includes a Message Type, XWAP Transaction ID and Criticality Diagnostics. People skilled in the art will appreciate that the WT Configuration Update procedure may be realized as a Class 2 procedure (i.e., unacknowledged by the receiving eNodeB 30). In this case, there is a trade-off between a simpler implementation and a less reliable system behavior.

In a way similar to the WT Configuration Update procedure, some embodiments include specifying an eNB Configuration Update procedure from the eNodeB 30 to the WT 70, where the eNodeB 30 may update information about its own configuration such as updates of the list of served cells or updates of the list of neighboring cells.

Figure 15:
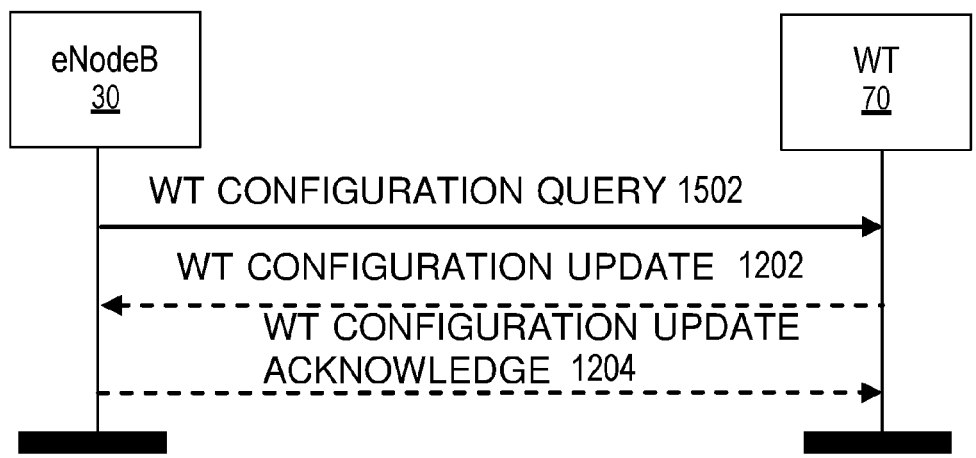
FIG. 15 is a diagram illustrating a configuration query procedure, according to some embodiments.

In some embodiments, a procedure flow may include a WLAN-enabled UE detecting a WLAN and reporting its BSSID, ESSID and radio parameters to its serving eNodeB 30. The eNodeB 30 looks up the BSSID and ESSID in its internal WNRT (WT Neighborhood Relationship Table). If the reported ESSID and BSSID are already present in the WNRT, the eNodeB 30 logically associates the UE with the WT ID corresponding to the reported ESSID and BSSID. When the ESSID and/or BSSID are not present, the eNodeB 30 queries the known WT(s) for the discovered ESSID and/or BSSID using the WT Configuration Query procedure, shown in FIG. 15.

A sample tabular structure for the message is shown in FIG. 16. The table includes a Message Type and a XWAP Transaction ID. The table also includes a list of queried ESSIDs and a list of queried BSSIDs. The second table of FIG. 16 includes the maximum number of queried ESSIDs (maxESSIDs) and the maximum number of queried BSSIDs (maxBSSIDs).

The WT CONFIGURATION QUERY message 1502 is sent by an eNodeB 30 to a WT 70 to query about newly discovered ESSID(s) and/or BSSID(s). If the requested ESSID(s) and/or BSSID(s) belong to the queried WT 70, the queried WT 70 initiates the WT Configuration Update procedure toward the eNodeB 30 signaling its complete updated configuration.

People skilled in the art will appreciate that the WT Configuration Query procedure may be realized as a Class 2 procedure (i.e., may be unacknowledged by the receiving WT 70). This way, the eNodeB 30 can deduce that not receiving a WT CONFIGURATION UPDATE message 1202 from a WT 70 means that the WT 70 is not serving any APs that are broadcasting the included ESSID and BSSIDs. This can reduce unnecessary signaling in the cases where the eNodeB 30 has connectivity to different WTs (e.g., several WLAN networks with the coverage area of the eNodeB 30).

It should be noted that since one WT can control/interface hundreds or even thousands of APs, only a fraction of those may be relevant/neighboring to a certain eNodeB. Therefore, instead of giving the information about all of its WLAN APs to all of the eNodeBs, the WT may only give information about some or all of the ESSID(s) and some of the BSSID(s) that its APs support during the initial Xw setup. Then, each eNodeB can query for information about individual APs that are being discovered by the UEs that it is serving via subsequent WT configuration procedures. If the ESSID to WT association is known but not the AP BSSID, the query information may be sent only to the WT associated to that ESSID.

In some embodiments, the method 600 includes sending a parameter to a UE to assist the UE in identifying the WLAN AP. For example, the WLAN AP communicates to the UE a locally unique parameter (AP Unique Identifier), which the UE can later communicate as part of the WLAN measurement report to the eNodeB 30. This parameter can help the eNodeB 30 distinguish between APs that broadcast the same ESSID and BSSID (in order to improve inter-AP mobility). This parameter can be communicated either via broadcast (e.g., Beacon frame, Fast Initial Link Discovery (FILS) Discovery frame, etc.) or unicast (e.g., Probe Response frames, Association or Reassociation Response frames, Authentication Response frames, Access Network Query Protocol (ANQP) message exchange, etc.) signaling. The AP Unique Identifier can be communicated as a newly defined information element or as a vendor-specific information element. The value of the element (i.e., the unique number) can either be drawn by the AP itself, or could be allocated by a WT.

It is observed that LTE-WLAN aggregation functionality may be similar to the Dual Connectivity (DC) functionality specified in Rel-12. DC functionality builds upon the capability to autonomously set up an X2 interface between the Master eNodeB (MeNB) and the Secondary eNodeB (SeNB) as needed, in order to exchange (among other things) the signaling needed for the DC functionality. Such capability may also be needed between the eNB and the WT in order to build similar functionality between LTE and WLAN. It is also observed that in order to provide the full flexibility needed for LTE-WLAN aggregation, support for autonomous setup and information exchange over Xw needs to be specified. Due to the specific eNB-WLAN architecture, it may not be possible to completely reuse the same paradigm specified for the X2 interface.

According to some embodiments, the Xw interface can be set up following radio measurement reports by one or more WLAN-enabled UEs to the serving eNodeB 30. For example, after the UE reports the relevant parameters for the WLAN(s) it picks up (e.g., ESSID, BSSID, channel, signal strength, etc.), the eNodeB 30 can try to set up the interface with the appropriate WT(s). This may be more straightforward than having the WT 70 initiate interface setup towards the eNodeB 30, since it is beneficial to be able to trigger it as needed from UE measurements.

Previously, there was no method for the eNodeB 30 to correlate the radio information reported by the UE with the appropriate TNL address(es) required to set up the Xw interface. An eNodeB 30 can already be preconfigured with the ESSID(s) or BSSID(s) present in its neighborhood, to be broadcasted in a SIB as assistance data for UEs, but this does not contain network-level information useful for setting up network interfaces.

It is observed that if the MME 90 was made aware of the WLAN deployment, the S1AP self-organizing network (SON) configuration transfer could be extended so that the eNodeB 30 can look up WT addresses through the MME 90. But the only way the MME 90 would know the TNL address of a WT 70 is through local configuration, so this would merely shift the burden of configuration to the MME 90. This would also be inconsistent with the objectives of both the Multi-RAT Joint Coordination Study Item and the LTE-WLAN Aggregation Work Item, since it would impact the Evolved Packet Core (EPC). In addition, this would introduce an exception in the current behavior which states that the MME 90 does not interpret the SON Configuration Transfer IE but transparently transfer it to the destination.

According to some embodiments, in reply to the Xw SETUP REQUEST message 802 from the eNodeB 30, the WT 70 signals the list of broadcasted ESSIDs and the APs it supports, with their BSSIDs, included with any radio-related information necessary to set up the relation. A WT configuration update procedure would be beneficial to enable a WT 70 to signal a change of configuration to the eNodeB(s) with which it has a relation.

According to some embodiments, a WT configuration update procedure enables a WT 70 to signal configuration changes to eNodeBs 30. This may include a "query" mechanism for an eNodeB 30 toward the WT 70. This can help in case, for example, a UE picks up an ESSID or BSSID that the eNodeB 30 does not know about, but which for some reason has not been propagated to the eNodeB 30. Such a potential WT configuration request query could be sent to the WT 70 with a list of queried ESSID(s)/BSSID(s). If the ESSID(s)/BSSID(s) present in the list belong to the queried WT 70, it can initiate a WT configuration update toward the eNodeB 30 signaling its complete updated configuration.

Figure 17:
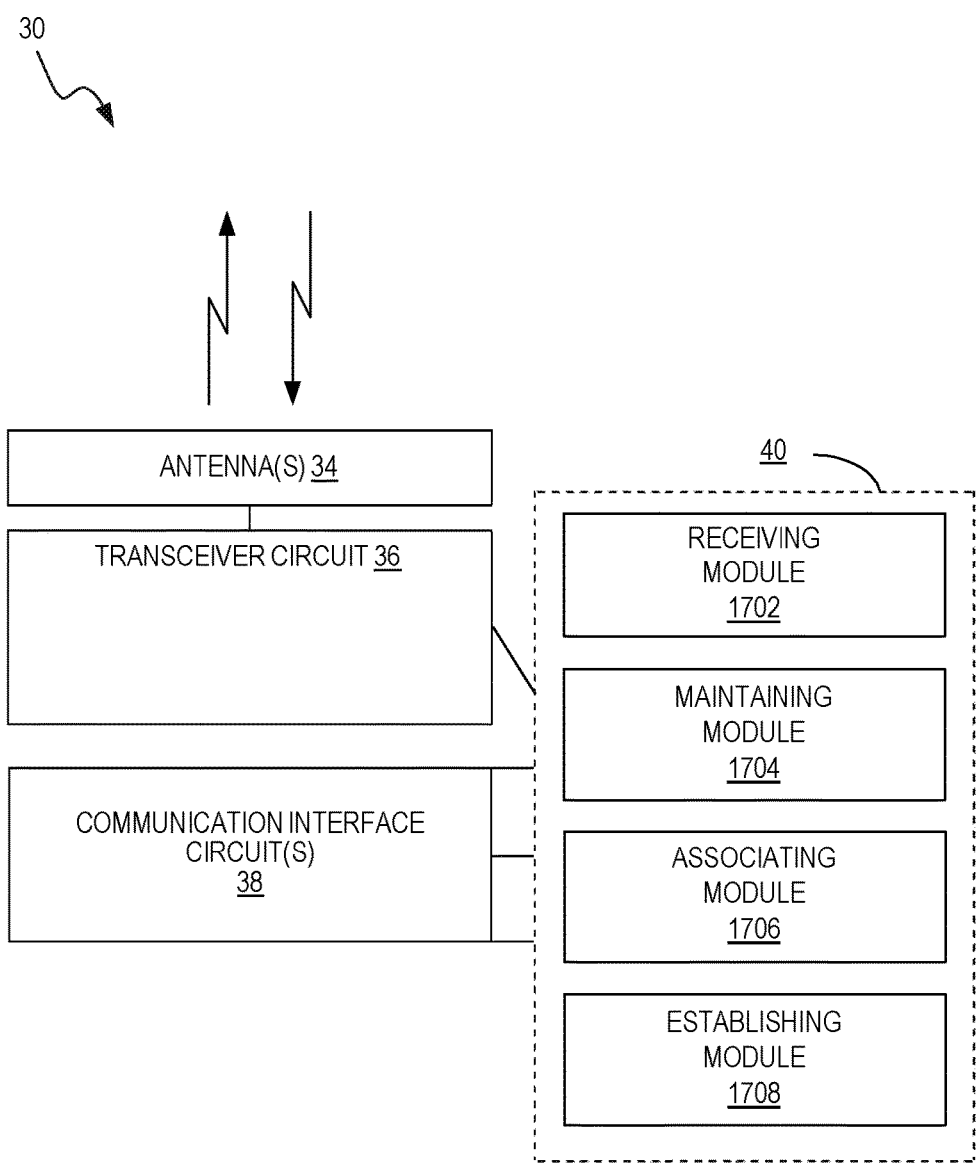
FIG. 17 illustrates an example functional implementation of a radio access network node configured to maintain a mapping for establishing an interface between the radio access network node and a WT, according to some embodiments.

FIG. 17 illustrates an example functional module or circuit architecture as may be implemented in the RAN node 30, e.g., based on the interface circuitry 40. The illustrated embodiment at least functionally includes a receiving module 1702 for receiving, from a WT 70, an ESSID and/or a BSSID for one or more WLAN access points controlled by the WT 70. The embodiment includes a maintaining module 1704 for maintaining a mapping between the ESSIDs and/or the BSSIDs and corresponding WLAN access points of the WT 70. The embodiment includes an associating module 1706 for, responsive to receiving a measurement report from a UE, the measurement report indicating an ESSID and/or a BSSID, associating the UE with a WLAN access point, based on the mapping. The embodiment may also include an establishing module 1708 for establishing an Xw interface 100 between the RAN node 30 and the WT 70 that controls the associated WLAN access point.

Figure 18:
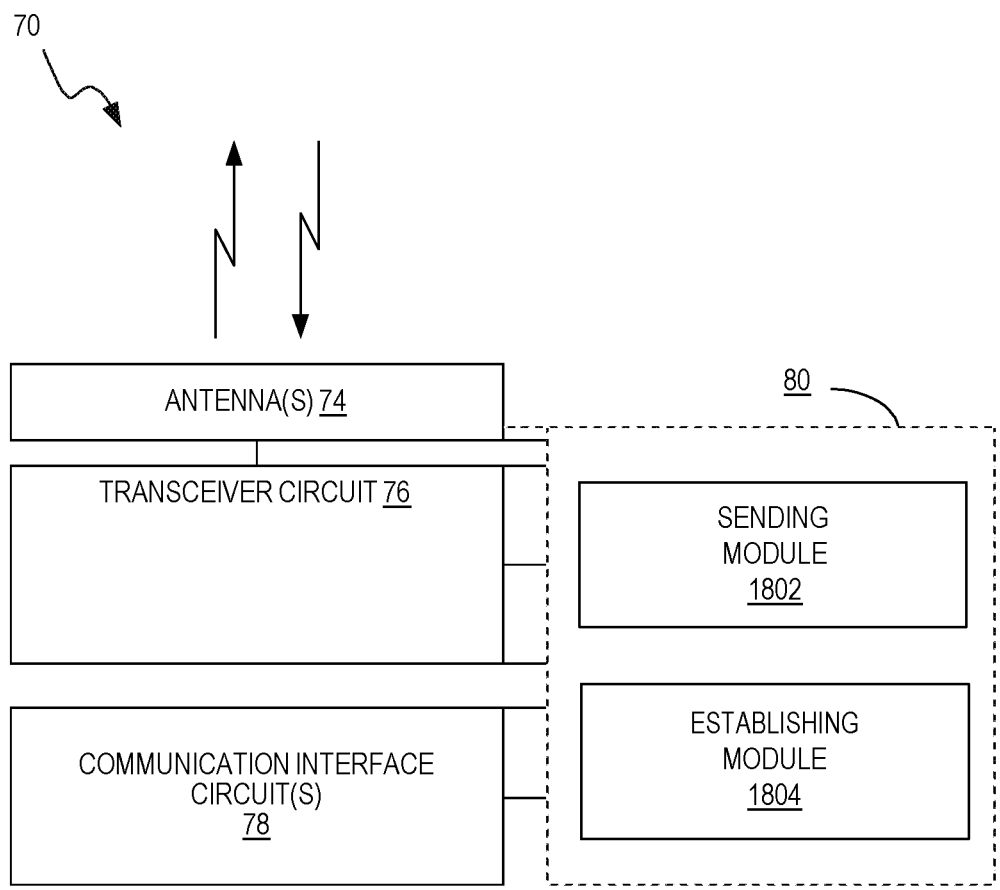
FIG. 18 illustrates an example functional implementation of a WT configured to send information for establishing an interface between the WT and a radio access network node, according to some embodiments.

FIG. 18 illustrates an example functional module or circuit architecture as may be implemented in the WT 70, e.g., based on the processing circuitry 80. The illustrated embodiment at least functionally includes a sending module 1802 for sending, to a RAN node 30, an ESSID and/or a BSSID for one or more WLAN access points controlled by the WT 70. The embodiment may also include an establishing module 1804, for, responsive to receiving a request from the RAN node 30, establishing an Xw interface 100 to the RAN node 30.

With the embodiments described herein, it is possible to autonomously set up and maintain a set of neighbor relationships between one or more eNodeBs and one or more WLAN nodes, minimizing OAM actions and enabling the network to optimize itself according to traffic and UE mobility. It is also possible to detect on the eNodeB side potential misconfigurations in the WLAN nodes and report them to OAM so that appropriate action can be taken. It is also possible to speed up the deployment of new WLAN APs in areas demanding higher capacity.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a radio access network node of a wireless communication network, the method comprising:
  receiving, from a Wireless Local-Area Network Termination (WT), an Extended Service Set Identifier (ESSID) and/or a Basic Service Set Identifier (BSSID) for one or more Wireless Local-Area Network (WLAN) access points controlled by the WT;

maintaining a mapping between the ESSIDs and/or the BSSIDs and corresponding WLAN access points of the WT; and responsive to receiving a measurement report from a user equipment (UE), the measurement report indicating an ESSID and/or a BSSID, associating the UE with a WLAN access point, based on said mapping.

2. The method of claim 1, further comprising establishing an interface between the radio access network node and the WT that controls the associated WLAN access point.

3. The method of claim 1, further comprising identifying a Transport Network Layer (TNL) address corresponding to the WT and associating the TNL address to the WT in the mapping.

4. The method of claim 3, wherein TNL addresses for one or more WTs neighboring the radio access network node are preconfigured in the radio access network node.

5. The method of claim 3, further comprising performing a Domain Name System (DNS) query to obtain TNL addresses for the one or more WTs neighboring the radio access network node.

6. The method of claim 1, further comprising requesting the ESSIDs and/or the BSSIDs from the WT.

7. The method of claim 1, further comprising sending a setup request message to the WT, wherein the setup request message comprises an interface access point transaction identifier that uniquely identifies the setup transaction and a unique global network access node identifier that identifies the radio access network node with a radio access network.

8. The method of claim 1, further comprising sending a configuration update message to the WT, wherein the configuration update message comprises a list of cells served by the radio access network node and a list of neighboring cells for the radio access network node.

9. A method, at a wireless local area network termination (WT) controlling one or more wireless local area network (WLAN) access points, the method comprising:

sending, to a radio access network node, an Extended Service Set Identifier (ESSID) and/or a Basic Service Set Identifier (BSSID) for one or more WLAN access points controlled by the WT; and responsive to receiving a request from the radio access network node, establishing an interface to the radio access network node.

10. The method of claim 9, further comprising sending a setup response message to the radio access network node responsive to receiving the request, wherein the setup response message comprises a WT identifier.

11. The method of claim 10, wherein the setup response message comprises the ESSID and/or the BSSID.

12. The method of claim 9, further comprising sending a parameter to a user equipment to assist the user equipment in identifying the WLAN access point.

13. A radio access network node configured to maintain a mapping for establishing an interface between the radio access network node and a wireless local area network termination (WT), the radio access network node comprising a processing circuit configured to:

receive, from the WT, an Extended Service Set Identifier (ESSID) and/or a Basic Service Set Identifier (BSSID) for one or more wireless local area network (WLAN) access points controlled by the WT;

maintain a mapping between the ESSIDs and/or the BSSIDs and corresponding WLAN access points of the WT; and responsive to receiving a measurement report from a user equipment (UE) the measurement report indicating an ESSID and/or a BSSID, associate the UE with a WLAN access point, based on said mapping.

14. The radio access network node of claim 13, wherein the processing circuit is further configured to establish an interface between the radio access network node and the WT that controls the associated WLAN access point.

15. The radio access network node of claim 13, wherein the processing circuit is further configured to identify a Transport Network Layer (TNL) address corresponding to the WT and to associate the TNL address to the WT in the mapping.

16. The radio access network node of claim 15, wherein TNL addresses for one or more WTs neighboring the radio access network node are preconfigured in the radio access network node.

17. The radio access network node of claim 15, wherein the processing circuit is further configured to perform a Domain Name System (DNS) query to obtain TNL addresses for the one or more WTs neighboring the radio access network node.

18. The radio access network node of claim 13, wherein the processing circuit is further configured to request the ESSIDs and/or the BSSIDs from the WT.

19. The radio access network node of claim 13, wherein the processing circuit is further configured to send a setup request message to the WT, and wherein the setup request message comprises an interface access point transaction identifier that uniquely identifies the setup transaction and a unique global network access node identifier that identifies the radio access network node with a radio access network.

20. The radio access network node of claim 13, wherein the processing circuit is further configured to send a configuration update message to the WT, wherein the configuration update message comprises a list of cells served by the radio access network node and a list of neighboring cells for the radio access network node.

21. A wireless local area network termination (WT) controlling one or more wireless local area network (WLAN) access points and configured to send information for establishing an interface between a radio access network node and the WT, the WT comprising a processing circuit configured to:

send, to the radio access network node, an Extended Service Set Identifier (ESSID) and/or a Basic Service Set Identifier (BSSID) for one or more WLAN access points controlled by the WT; and responsive to receiving a request from the radio access network node, establish the interface to the radio access network node.

22. The WT of claim 21, wherein the processing circuit is further configured to send a setup response message to the radio access network node responsive to receiving the request, wherein the setup response message comprises a WT identifier.

23. The WT of claim 22, wherein the setup response message comprises the ESSID and/or the BSSID.

24. The WT of claim 21, wherein the processing circuit is further configured to send a parameter to a user equipment to assist the user equipment in identifying the WLAN access point.

25. A non-transitory computer readable storage medium storing a computer program for maintain a mapping for establishing an interface between a radio access network node and a wireless local area network termination (WT), the computer program comprising program instructions that, when executed on a processing circuit of the radio access network node, cause the processing circuit to:

receive, from the WT, an Extended Service Set Identifier (ESSID) and/or a Basic Service Set Identifier (BSSID) for one or more wireless local area network (WLAN) access points controlled by the WT;

maintain a mapping between the ESSIDs and/or the BSSIDs and corresponding WLAN access points of the WT; and responsive to receiving a measurement report from a user equipment (UE), the measurement report indicating an ESSID and/or a BSSID, associate the UE with a WLAN access point, based on said mapping.

26. A non-transitory computer readable storage medium storing a computer program for sending information for establishing an interface between a radio access network node and a wireless local area network termination (WT), the computer program comprising program instructions that, when executed on a processing circuit of the WT, cause the processing circuit to:

send, to the radio access network node, an Extended Service Set Identifier (ESSID) and/or a Basic Service Set Identifier (BSSID) for one or more wireless local area network (WLAN) access points controlled by the WT; and responsive to receiving a request from the radio access network node, establish an interface to the radio access network node.

* * * * *

UNITED STATES PATENT AND TRADEMARK OFFICE
CERTIFICATE OF CORRECTION

PATENT NO. : 10,009,815 B2
APPLICATION NO. : 15/027006
DATED : June 26, 2018
INVENTOR(S) : Masini et al.

It is certified that error appears in the above-identified patent and that said Letters Patent is hereby corrected as shown below:

In the Drawings

In Fig. 10, Sheet 10 of 18, delete "[figure]" and insert --[figure]--, therefor.

In Fig. 11, Sheet 11 of 18, "[figure]" and insert

Signed and Sealed this
Fourth Day of December, 2018

Andrei Iancu
*Director of the United States Patent and Trademark Office*

CERTIFICATE OF CORRECTION (continued)
U.S. Pat. No. 10,009,815 B2

In Fig. 13, Sheet 13 of 18, delete "[table image]" and insert --[table image]--, therefor.

In the Specification

In Column 7, Line 24, delete "AP 70." and insert -- WT 70. --, therefor.

In Column 11, Line 45, delete "SlAP" and insert -- S1AP --, therefor.

In Column 12, Line 30, delete "processing circuitry 80." and insert -- interface circuitry 80. --, therefor.